No. 647,384. Patented Apr. 10, 1900.
G. A. ENSIGN.
HUB TURNING LATHE.
(Application filed July 19, 1899.)
(No Model.) 3 Sheets—Sheet 1.

WITNESSES:
Edward Thorpe
Rev. G. Hosker

INVENTOR
G. A. Ensign
BY
ATTORNEYS

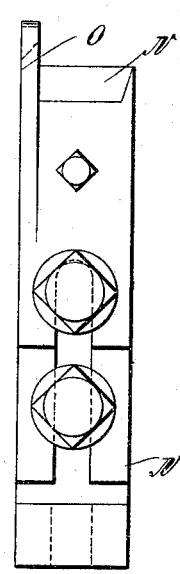
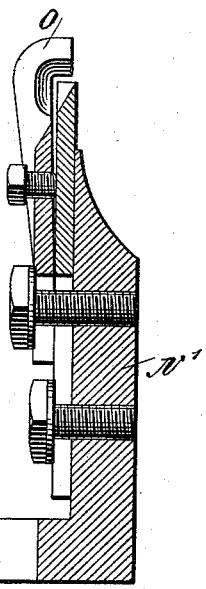
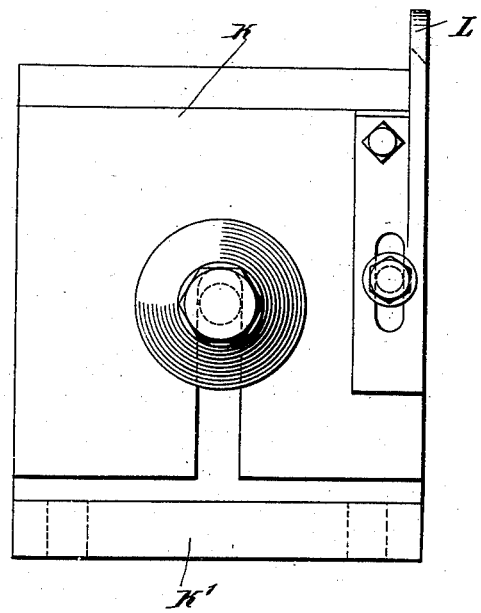
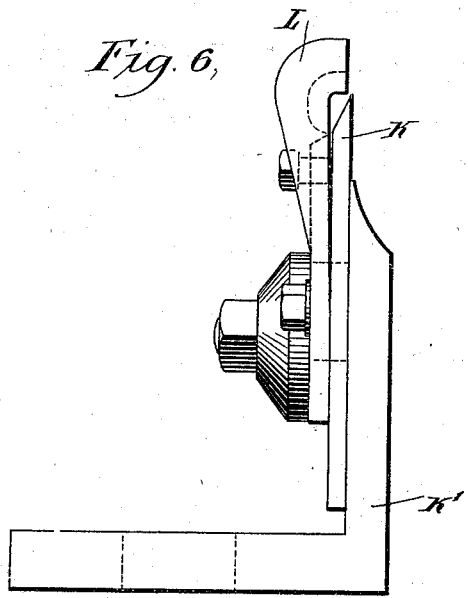
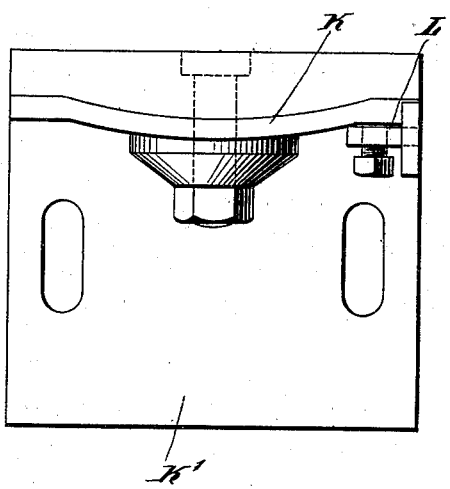

No. 647,384. Patented Apr. 10, 1900.
G. A. ENSIGN.
HUB TURNING LATHE.
(Application filed July 19, 1899.)
(No Model.) 3 Sheets—Sheet 3.
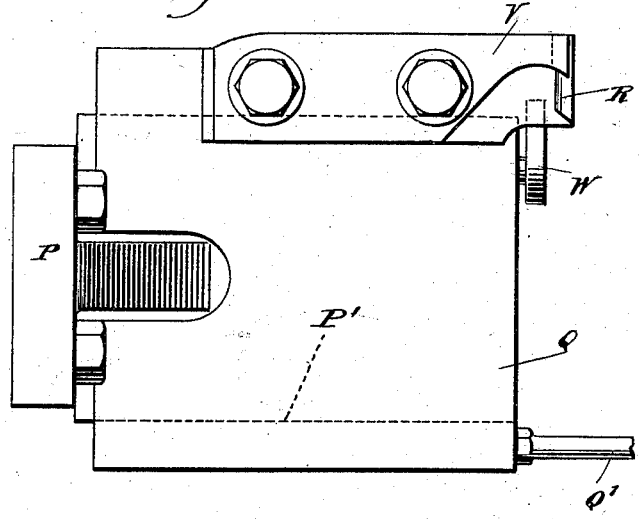
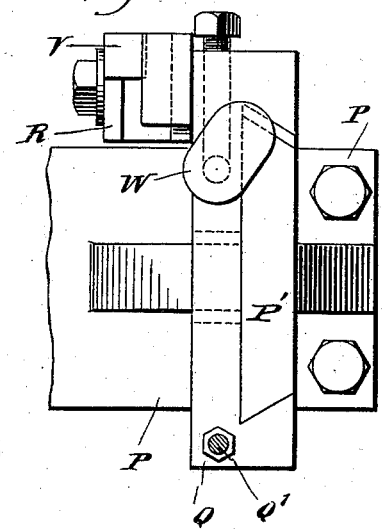
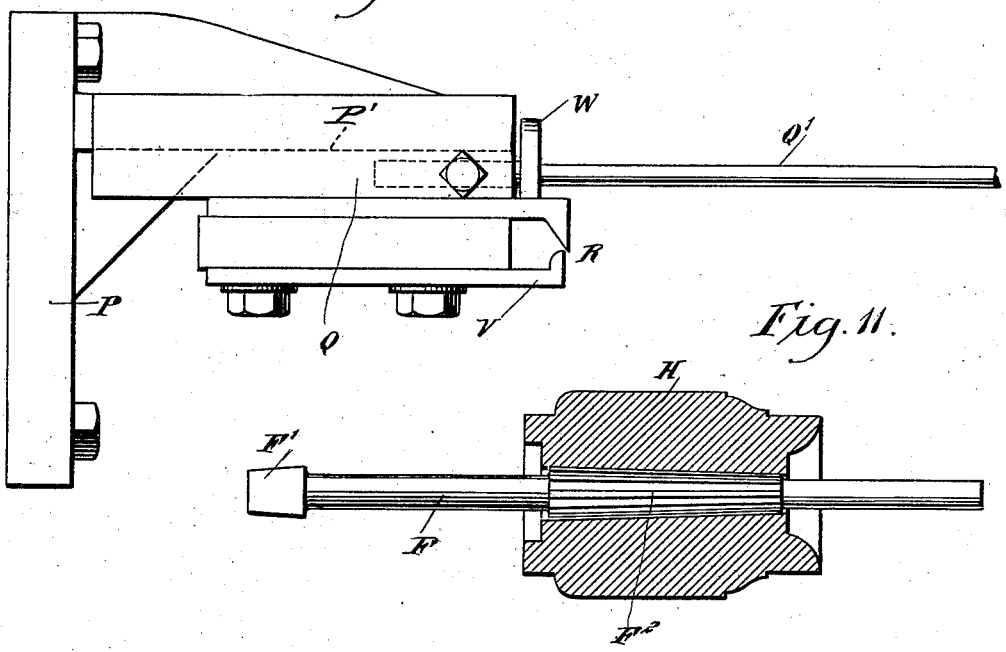
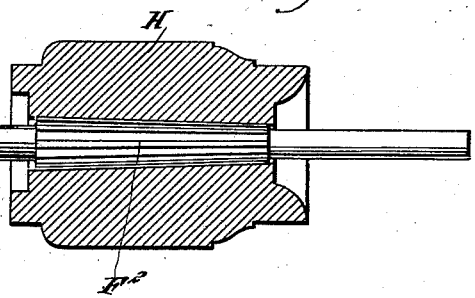
WITNESSES:
Edward Thorpe
INVENTOR
G. A. Ensign
BY
ATTORNEYS

UNITED STATES PATENT OFFICE.

GEORGE A. ENSIGN, OF DEFIANCE, OHIO, ASSIGNOR TO THE DEFIANCE MACHINE WORKS, OF SAME PLACE.

HUB-TURNING LATHE.

SPECIFICATION forming part of Letters Patent No. 647,384, dated April 10, 1900.

Application filed July 19, 1899. Serial No. 724,390. (No model.)

*To all whom it may concern:*

Be it known that I, GEORGE A. ENSIGN, of Defiance, in the county of Defiance and State of Ohio, have invented a new and Improved Hub-Turning Lathe, of which the following is a full, clear, and exact description.

The invention relates to wood-working machinery; and its object is to provide a new and improved turning-machine more especially designed for automatically turning vehicle-wheel hubs and arranged to produce very smooth work, to turn out a large number of hubs in a given time, and to turn hubs of various shapes with the cutting-angle of the knives or cutters practically the same for all sizes of hubs and with the strain in the direction of the greatest strength of the machine.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
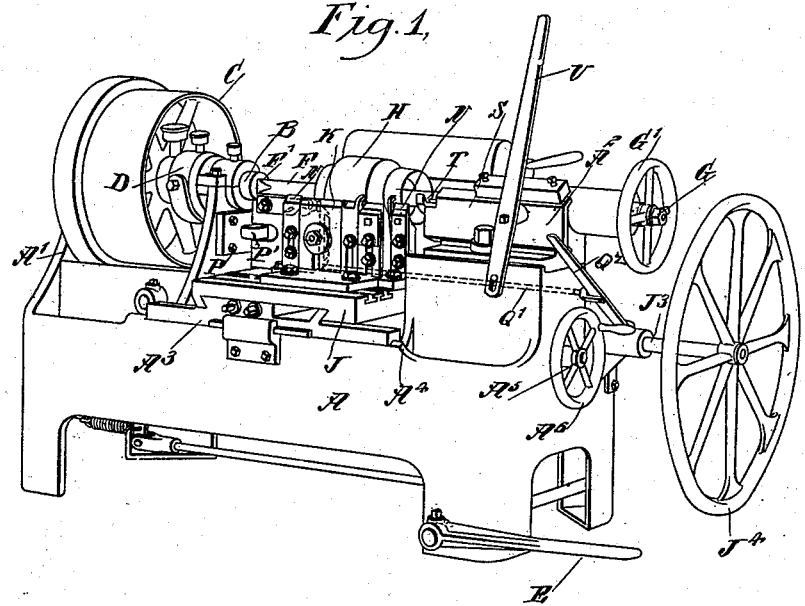
Figure 2:
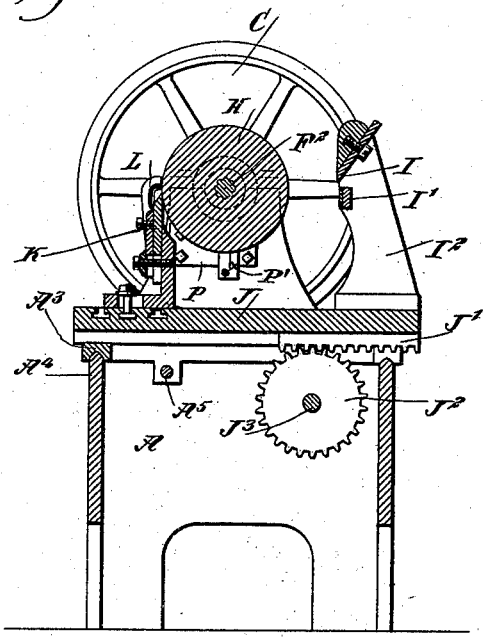

Figure 1 is a perspective view of the improvement. Fig. 2 is an enlarged transverse section of the same. Fig. 3 is an enlarged front view of one of the cutting-knives and its gage. Fig. 4 is a transverse section of the same. Fig. 5 is an enlarged front elevation of the peripheral shaping or finishing knife and its gage. Fig. 6 is an end elevation of the same. Fig. 7 is a plan view of the same. Fig. 8 is an enlarged side elevation of the front cupping device. Fig. 9 is an end view of the same. Fig. 10 is a plan view of the same, and Fig. 11 is an enlarged sectional side elevation of the hub in position on the mandrel.

The improved hub-turning lathe is mounted on a suitably-constructed bed A, supporting at one end bearings A' for a shaft B, carrying a pulley C, connected by belt with other machinery to rotate the pulley, the latter being adapted to drive the shaft B by a suitable friction-clutch D under the control of the operator manipulating a foot-piece E at the front end of the machine. The shaft B is provided at its inner end with a socket for the reception of the square F' of a mandrel F, engaged by a center G, held longitudinally adjustable in suitable bearings $A^2$, arranged on the end of the frame opposite the bearing A'. A hand-wheel G' on the center G serves to turn the latter and shift the same longitudinally to properly engage or disengage the mandrel in the usual manner.

The mandrel F is provided near its middle with a conical part $F^2$, fluted longitudinally and adapted to be driven into the conical bore of a block H, cut to about the length of the hub to be finished, but otherwise in a comparatively rough state at the time of being placed, with the mandrel, in the machine. The block H is first roughened by a rougher located at the back of the machine and provided with a knife I operating in conjunction with a steel facing I' for cutting a thin ribbon from the block H, thus preventing a rank cut, or what is known as "hogging in." The knife I and the steel face I' are secured on a bracket $I^2$, attached to the rear side of a table J, mounted to slide transversely in suitable bearings $A^3$, adjustably held in a longitudinal direction on guideways $A^4$, carried by the bed A.

On the under side of the table J is arranged a transversely-extending rack J', in mesh with a gear-wheel $J^2$, secured on a longitudinally-extending shaft $J^3$, journaled in the bed A and carrying at its outer end a hand-wheel $J^4$, under the control of the operator. A longitudinal sliding motion is given to the bearing $A^3$ by a screw-shaft $A^5$, carrying a hand-wheel $A^6$ at its outer end to permit of adjusting said bearing, the table J, and the knives carried thereon relatively to the block H, so as to insure a proper formation of the block into a hub.

On the front side of the table J are carried the peripheral shaping or finishing knives K for turning the peripheral surface of the block after it has been roughened, as hereinafter more fully described, said shaping or finishing knives being held vertically adjustable on tool-carriers K', held longitudinally and transversely adjustable on the table J. On the tool-carrier K' is also adjustably held a depth-gage L for preventing the shaping or finishing knives from making too deep a cut at the time. (See Figs. 5, 6, and 7.)

On the table J and at the ends thereof are arranged cutting-off or equalizing knives N, held vertically adjustable on tool-holders N', longitudinally and transversely adjustable on the table J by suitable devices. On one of the holders N' is arranged a depth-gage O for preventing the knives from making too deep a cut at the time and for insuring even and smooth work, it being understood that the cutting-off or equalizing knives N serve to cut the hub the exact length.

On the inner face of the bearings A' is bolted or otherwise secured a bracket comprising a base P and a longitudinally-disposed arm P', on which arm is mounted to slide a tool-holder Q, carrying the cupper R for forming a cup in one end of the hub, said tool-holder Q being provided with a rod Q', fitted to slide longitudinally in the bed A and connected with a lever $Q^2$, under the control of the operator, for shifting the tool-holder Q and the cupper R longitudinally to move the cupper in engagement with the end of the block to form the cup therein and to move the cupper out of engagement with the block after the cup has been finished. On the bearing $A^2$ of the bed A is mounted to slide a tool-holder S, carrying the opposite cupper T, similar in arrangement to the cupper R and adapted to engage the other end of the block to form the cup therein. The tool-holder S is connected with a lever U, fulcrumed on the bed A and under the control of the operator for moving the cupper T in and out of engagement with the corresponding end of the hub. Each of the cuppers R and T is provided with a depth-gage V for preventing too deep a cut at the time and for insuring a smooth turning of the cups.

On the tool-holder Q is held longitudinally adjustable a stop W for limiting the inward sliding of the corresponding cupper and regulating the depth of the cup, it being expressly understood that the gages V, O, and L serve to regulate the depth of an individual cut or shaving.

The operation is as follows: In using the machine the block to be formed into a hub and cut to about the length and bored is driven upon the mandrel F, as described, and shown in Fig. 11, and then this mandrel is connected with its square end F' with the shaft B and engaged at its other end by the center G. The operator presses with his foot the foot-piece E, so that the friction-clutch D connects the shaft B with the revolving pulley C to rotate the shaft B, the mandrel F, and the block H. The operator then turns the hand-wheel $J^4$, so as to impart a transverse movement to the table J to the front, so that the rougher-knife I moves toward the block and roughens the same. When this has been done, the operator turns the hand-wheel $J^4$ in the opposite direction, so as to cause the rougher to retreat from the roughened block H and to cause the knives K and N to advance toward the block to cut the peripheral face thereof and also to cut the ends to give the length to the hub. When this has been done, the operator turns the wheel $J^4$ back a short distance to move the knives K and N out of engagement with the hub, so that the latter stands between the rougher-knife I and the knives K and N with both out of contact with the hub. The operator now moves the levers U and Q' either simultaneously or successively to bring the cuppers R and T into action to form the front and rear cups B in the ends of the hub, and when this operation is repeated the cuppers are moved in the opposite direction out of engagement with the hub, and then the center G is run out, the mandrel F is removed from the shaft B, and the finished hub is driven off the mandrel. The above-described operation is then repeated—that is, another block is put on the mandrel, the latter is inserted in the machine, the block is roughened and turned at its periphery, cut off at the ends, and formed with cups in the end, as above mentioned.

Having thus fully described my invention, I claim as new and desire to secure by Letters Patent—

1. In a hub-turning lathe, the combination with a bed, of bearings longitudinally adjustable on the bed, means for adjusting the bearings, a table mounted to move transversely on the bearings, gearing for moving the table, a shaft mounted to turn in the bed and connected with said gearing to drive the same, the shaft projecting out from the bed and provided with a hand-wheel, tools mounted on the table, means mounted on the bed for holding and turning the work, a tool-holder mounted to slide on the bed at the one end thereof, a lever working between the bed and tool-holder to control the latter, a cupping-tool held by said tool-holder, a bracket mounted on the opposite end of the bed, a second tool-holder arranged to slide on said bracket, a second cupping-tool held by said second tool-holder, a rod attached to the second tool-holder and extended rearward, and a lever mounted at the rear of the bed and connected with the said rod.

2. In a hub-turning lathe, the combination with a bed and with devices for holding and turning the work, of cupping-tool holders for each end of the hub mounted on the bed to move longitudinally of the work, a lever at one end of the bed and connected with one cupping-tool holder, to control the same, a rod attached to the other cupping-tool holder and extended to the end of the bed adjacent to said lever, and a second lever connected with the rod to control the cupping-tool holder thereon.

3. In a hub-turning lathe, the combination with the bed and devices for holding, turning and side cutting the work, of cupping-tool holders for each end of the hub mounted on the bed, to move longitudinally of the work, and two separate means for controlling said tool-holders to bring them into and out of action, such means extending both to the same bed.

4. In a hub-turning lathe, the combination with the bed and devices for holding, turning, and side cutting the work, of a cupping-tool holder mounted to slide on the bed at one end thereof, a lever working between said tool-holder and the bed to move the tool-holder, a bracket mounted at the opposite end of the bed, a cupping-tool holder arranged to slide on said bracket, a rod attached to the second-named cupping-tool holder and extended to the end of the bed having the first-named tool-holder, and a lever situated at the said end of the bed and connected with the rod to control the cupping-tool holder thereof.

5. In a hub-turning lathe, the combination with a bed and with devices for holding and turning the work, of a table mounted to slide on the bed beneath the work transversely thereof, a tool-holder mounted on the table and adjustable thereon longitudinally of the lathe, the tool-holder comprising an upper part standing perpendicularly to the table, and a finishing-knife mounted on the said upper part of the tool-holder and standing parallel therewith, the edge of the knife being at the upper end thereof and lying at the side of the work approximately in the plane of its axis.

GEORGE A. ENSIGN.

Witnesses:
GEORGE W. DEATRICK,
CHARLES H. KETTENRING.